United States Patent

[11] 3,540,595

| [72] | Inventor | Miles Lowell Edwards<br>13191 Sandhurst Place, Santa Ana,<br>California 92705 |
|---|---|---|
| [21] | Appl. No. | 692,151 |
| [22] | Filed | Dec. 20, 1967<br>A continuation-in-part of Ser. No. 456,675, May 18, 1965, abandoned, which is a continuation-in-part of Ser. No. 631,668, Apr. 18, 1967, now Pat. No. 3,459,310. |
| [45] | Patented | Nov. 17, 1970 |

[54] MEMBRANE FLUID DIFFUSION EXCHANGE DEVICE
6 Claims, 17 Drawing Figs.

[52] U.S. Cl. .................................................. 210/321,
23/258.5
[51] Int. Cl. ............................................... B01d 31/00
[50] Field of Search ........................................... 210/321;
23/258.5

[56] References Cited
UNITED STATES PATENTS
3,332,746  7/1967  Claff et al. .................... 210/321X
3,362,540  1/1968  Bluemle ........................ 210/321
3,396,849  8/1968  Lande et al. .................. 210/321
3,411,630  11/1968  Alwall et al. ................. 210/321
3,412,865  11/1968  Lontz et al. ................... 210/321
3,074,559  1/1963  Savino .......................... 210/321
3,459,310  8/1969  Edwards ....................... 210/321

OTHER REFERENCES
Anthonisen, et al., " Clinical Experience With The Skeggs-Leonards Type of Artificial Kidney" , from the Lancet, Dec. 22, 1956, page 1277 relied on. Hollander, et al., " A New Type of Artificial Kidney. I. Technique" , from Journal of Urology" , Vol. 69, No. 5, May, 1953, pp. 605—613 relied on.

*Primary Examiner*—Frank A. Spear, Jr.
*Attorney*—Lee R. Schermerhorn

ABSTRACT: A stack of plates and membranes for use primarily as a blood oxygenator or kidney dialysis device. The plates are all identical, being grooved in their opposite sides to define capillary fluid passageways and distribution and collecting ducts for two fluids on opposite sides of the membranes. A first embodiment employs double membranes of elastic material and a second embodiment employs single membranes of inelastic material.

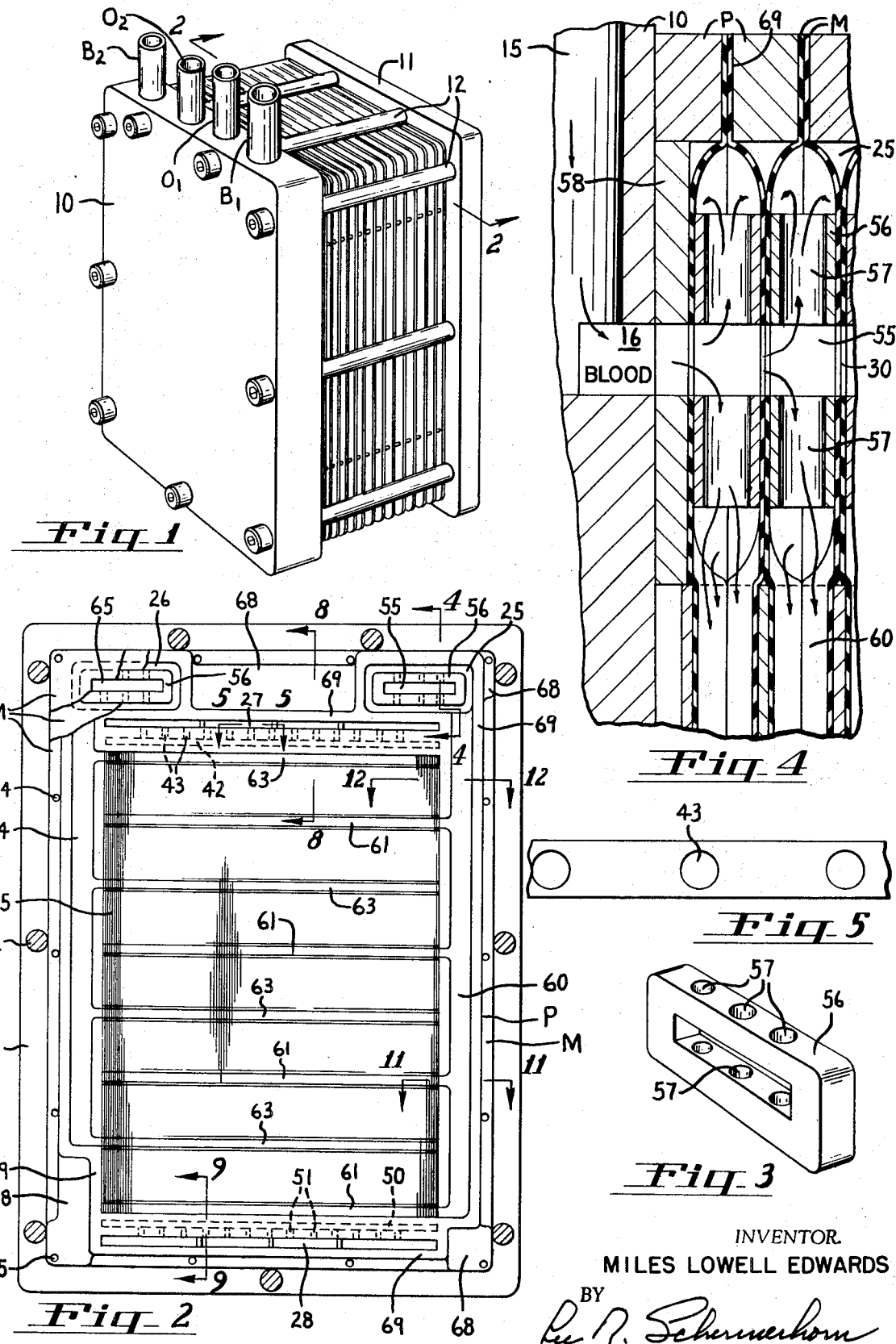

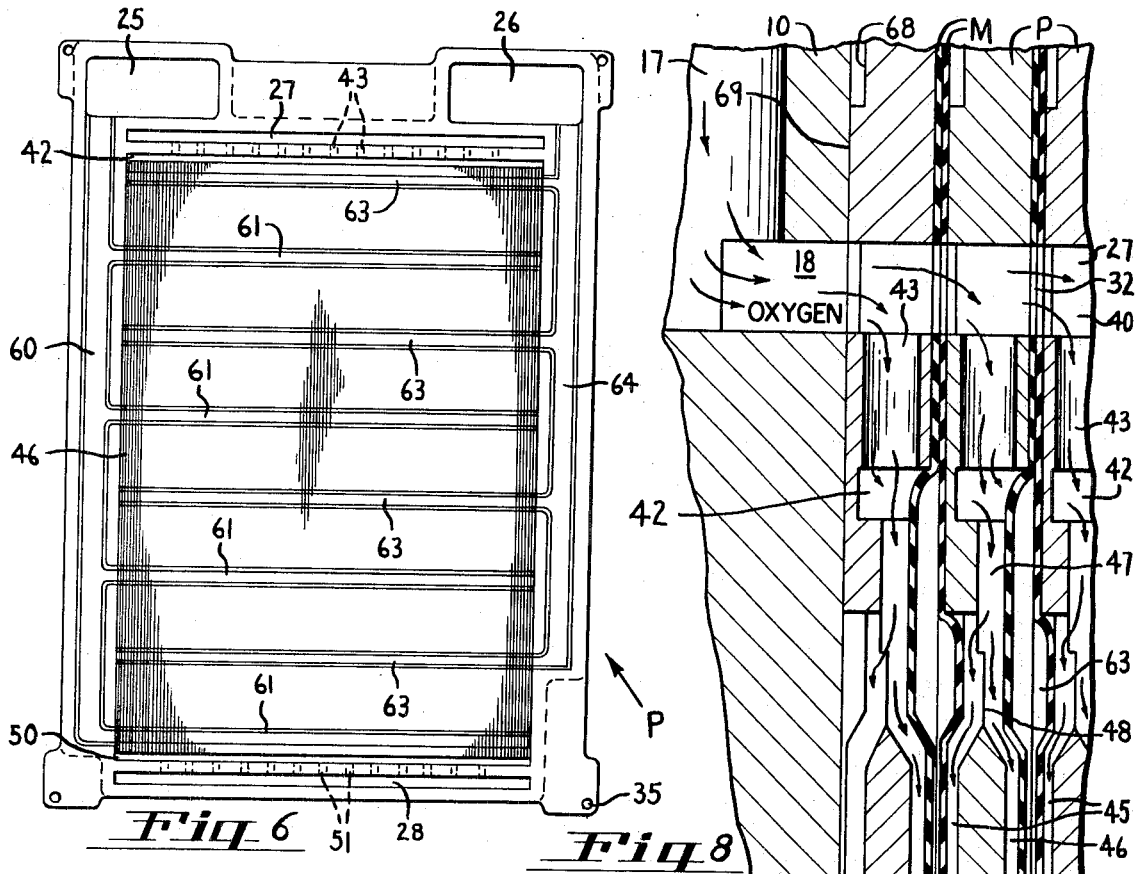
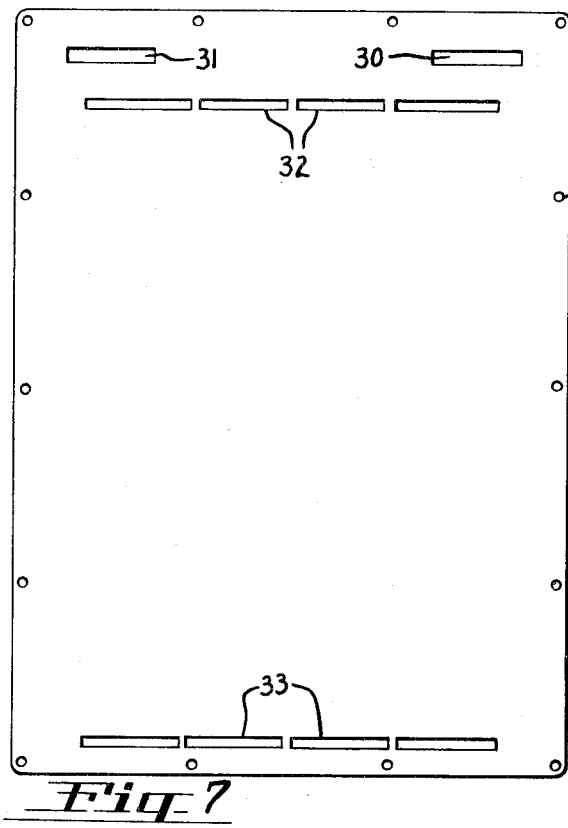

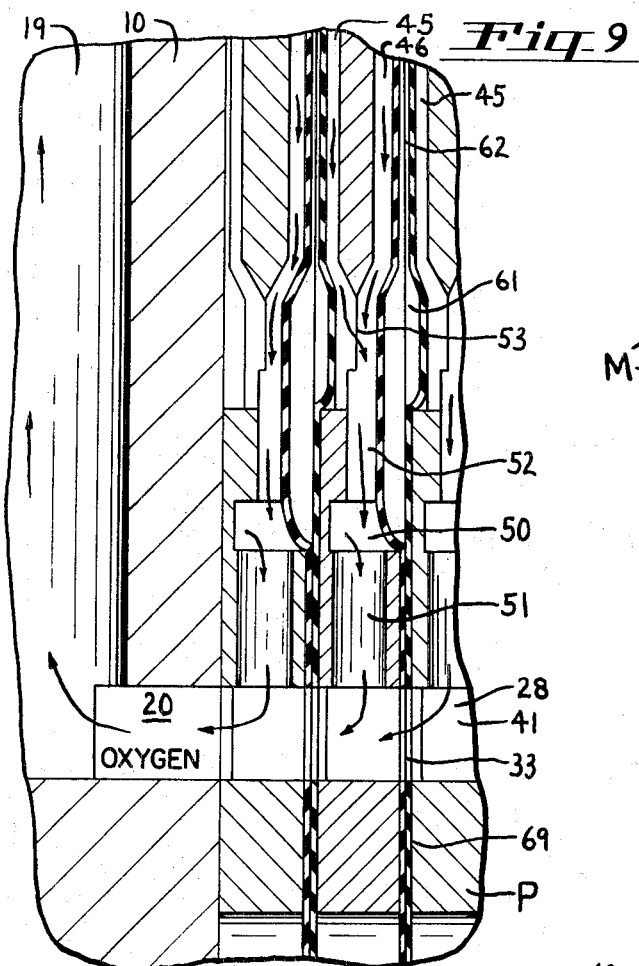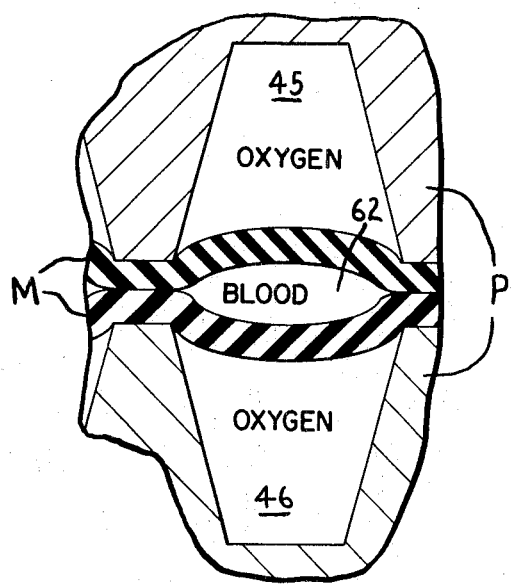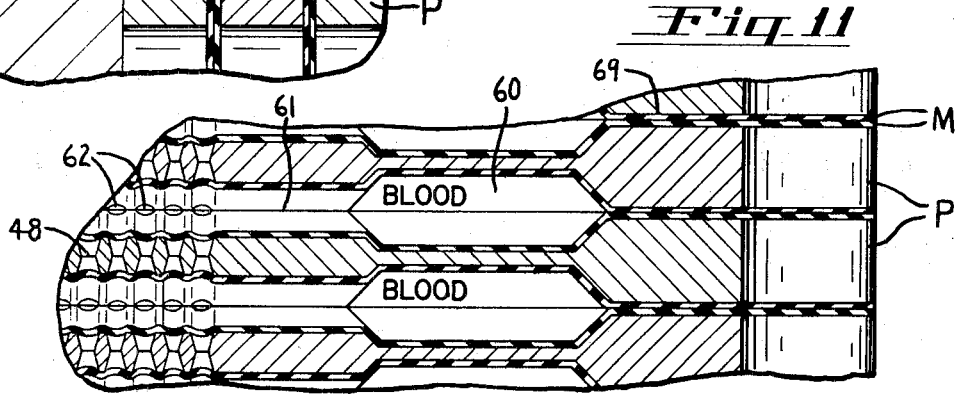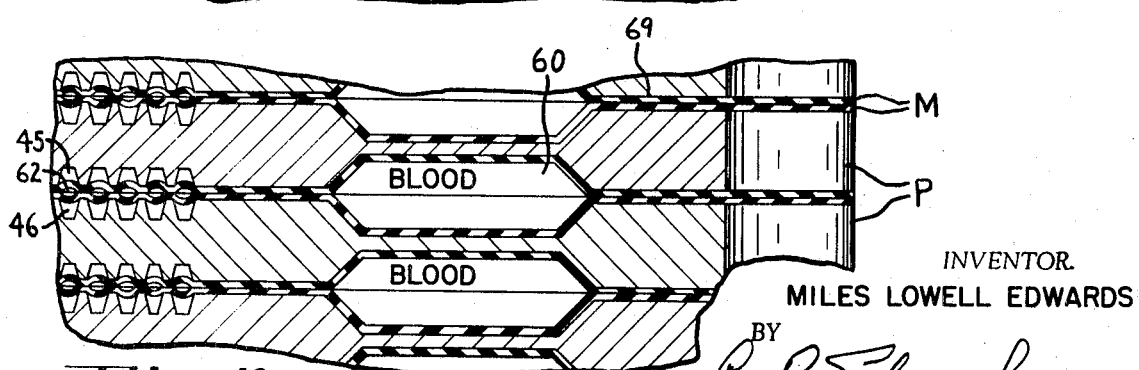

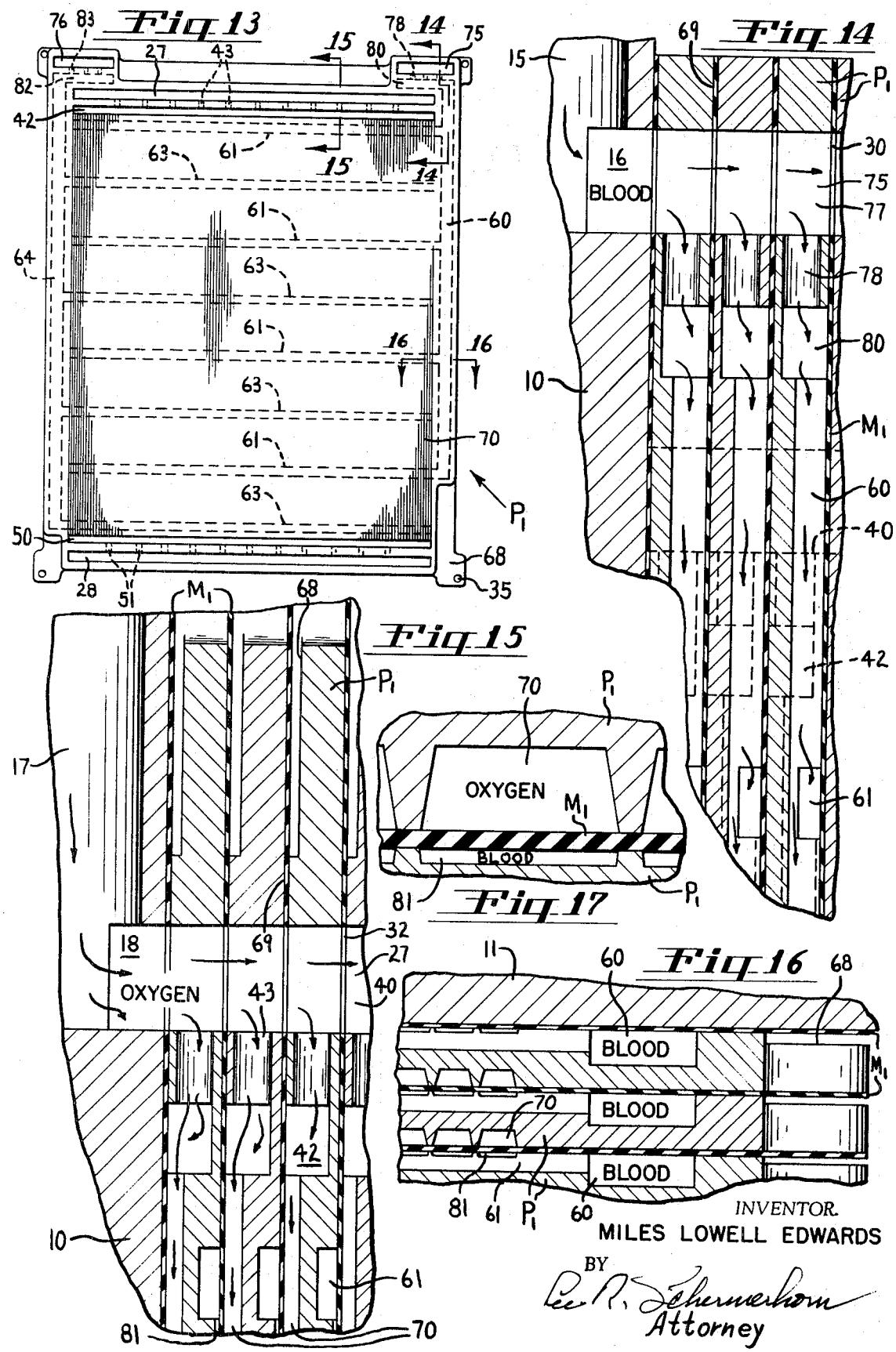

MEMBRANE FLUID DIFFUSION EXCHANGE DEVICE

CROSS-REFERENCES TO RELATED APPLICATIONS

This application is a continuation-in-part of Ser. No. 456,675 filed May 18, 1965, now abandoned, for Membrane Diffusion Device and Ser. No. 631,668 filed Apr. 18, 1967, now U.S. Pat. No. 3,459,310, for Membrane Fluid Diffusion Exchange Device.

BACKGROUND OF THE INVENTION

Previous membrane diffusion devices for blood oxygenation and dialysis purposes have been difficult and costly to manufacture. They have also been objectionably bulky, requiring an excessive amount of priming blood to fill the blood passageways and chambers. Such bulk results from the problem of providing a sufficiently large area of the membrane material in contact with the blood for effective diffusion exchange.

It will be recognized that such a device is practically impossible to clean and resterilize whereby the device must be made for a single use. It is desired to provide an improved form of construction which is less complicated and expensive to manufacture and which requires less priming blood than existing devices for the purpose.

SUMMARY OF THE INVENTION

This invention relates to a membrane fluid diffusion exchange device, particularly for the oxygenation or dialysis of blood. The device is intended for temporary bedside use and, when used as an oxygerator, would be employed temporarily for a limited period of time to improve the condition of the patient's blood. For example, blood may be taken from a vein in the patient's leg, passed through a suitable pump, oxygenated in the present device and returned to an artery in the patient's arm. In such use the present device does not take the place of the patient's own lungs as in a surgical heart-lung machine but merely supplements the oxygenating effort of the patient's lungs. However, the present device may also be made of sufficient capacity to be used as an oxygenator in a heart-lung machine to take the place of the patient's own lungs temporarily during surgery, if desired.

The present device comprises a stack of plates and membranes which are clamped together between rigid end plates so that there can be no leakage between the clamped surfaces. The plates and membranes have registering openings to provide inlet and outlet passageways through the stack for two fluids. The plates are all identical and are grooved on their opposite sides to define capillary fluid passageways and distribution and collecting ducts for the two fluids. Such support of the membranes permits the use of very thin and fragile membrane material. In a first embodiment the membranes are made of elastic material and the membranes are clamped in pairs between the plates. In a second embodiment the membranes are made of inelastic material and individual membranes are clamped between the plates. The use of inelastic membranes allows a still wider selection of available membrane materials.

The capillary system is formed by a pattern of minute grooves which are closed on one side by a membrane sheet. This is an improvement over the device in Ser. No. 456,675 wherein the capillary system comprises passageways formed in a membrane envelope wherein the membrane material is required to be heat sealable. The present forms of construction permit the use of a wider range of membrane materials which are not heat sealable. The geometric pattern of the capillary system and distribution and collecting ducts is generally similar to that in Ser. No. 456,675, however.

The objects of the invention are, therefore, to provide an improved membrane fluid diffusion exchange device, to provide a device of the type described which is less complicated and expensive to manufacture, and which requires less priming fluid, than existing devices, to provide a device of the type described comprising a stack of membrane sheets and plates in which elastic membrane sheets are clamped in pairs between two supporting plates, to provide an alternative arrangement in which inelastic membranes are clamped individually between the plates, to provide a device of the type described having capillary passageways formed by grooves in supporting plates which are sandwiched together with membrane sheets, to provide an improved capillary system in the general geometric pattern and arrangement shown in Ser. No. 456,675, and to provide a device in which all the plates are identical.

The foregoing and other objects and advantages will become apparent and the invention will be better understood with reference to the following description of certain preferred embodiments illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a perspective view of a device embodying the principles of the invention;

FIG. 2 is a view on the line 2–2 in FIG. 1, with parts broken away;

FIG. 3 is an enlarged perspective view of a spacer block in FIG. 2;

FIG. 4 is an enlarged view on the line 4–4 in FIG. 2;

FIG. 5 is an enlarged view on the line 5–5 in FIG. 2;

FIG. 6 is an elevation view of the back side of the grooved plate shown in FIG. 2;

FIG. 7 is an elevation view of a membrane;

FIG. 8 is an enlarged view on the line 8–8 in FIG. 2;

FIG. 9 is an enlarged view on the line 9–9 in FIG. 2;

FIG. 10 is a greatly enlarged fragmentary cross-sectional view showing the capillary passageways;

FIG. 11 is an enlarged view on the line 11–11 in FIG. 2;

FIG. 12 is an enlarged view on the line 12–12 in FIG. 2;

FIG. 13 is an elevation view of a grooved plate in a modified form of construction;

FIG. 14 is an enlarged view on the line 14–14 in FIG. 13, showing a portion of the stack of assembled plates and membranes in the modification;

FIG. 15 is a similar view on the line 15–15 in FIG. 13;

FIG. 16 is a similar view on the line 16–16 in FIG. 13; and

FIG. 17 is a greatly enlarged fragmentary cross-sectional view showing the capillary passageways in the modification in FIGS. 13 to 16.

DESCRIPTION OF THE PREFERRED EMBODIMENTS

As shown in FIG. 1, the device comprises a stack of plates and membranes tightly clamped between a pair of rigid front and back plates 10 and 11 for use as a blood oxygenator. Clamping pressure is maintained by a plurality of marginal bolts 12. Front plate 10 is equipped with a blood inlet connection $B_1$, a blood outlet connection $B_2$, an oxygen inlet connection $O_1$ and an oxygen outlet connection $O_2$.

Blood inlet connection $B_1$ communicates with a short vertical bore 15 in plate 10 for conveying blood to the front end of the stack of plates and membranes through a port 16 in the back side of the upper right portion of plate 10 as shown in FIG. 4. Blood outlet connection $B_2$ communicates with a similar bore and port in the upper left portion of the plate 10, not shown.

Oxygen inlet connection $O_1$ communicates with a short vertical bore 17 for conveying oxygen into the front end of the stack of plates and membranes through a port 18 as shown in FIG. 8. Port 18 extends horizontally along the upper portion of the back side of plate 10 below the blood inlet and outlet ports. Oxygen outlet connection $O_2$ communicates with a long vertical bore 19 in plate 10 for removing oxygen from the front end of the stack of plates and membranes through a port 20 near the bottom of plate 10 as shown in FIG. 9. Port 20 extends horizontally along the lower portion of plate 10.

The plates P are all identical, FIG. 2 showing the front side and FIG. 6 showing the back side. The upper right corner of each plate contains an opening 25 for incoming blood and the upper left corner contains an opening 26 for outgoing blood. Just below these openings is an elongated horizontal oxygen inlet opening 27 in register with oxygen inlet port 18 in FIG. 8. Extending along the bottom of the plate is an elongated oxygen outlet opening 28 in register with outlet port 20 in FIG. 9.

The membranes M are all identical as shown in FIG. 7. In the upper right-hand corner of each membrane is a blood inlet opening 30 and in the upper left corner a blood outlet opening 31. Extending horizontally below these openings is a horizontal series of oxygen inlet openings 32. Extending horizontally along the bottom of the membrane is a series of oxygen outlet openings 33. The membranes have marginal apertures 34 and the plates have corner apertures 35 to receive guide pins for stacking.

In building the stack, the membranes M are placed in pairs between the plates P. Openings 32 in the membranes register with openings 27 in the plates to form an oxygen inlet manifold passageway 40 extending through the stack as shown in FIG. 8. Similarly, openings 33 in the membranes register with openings 28 in the plates to form an oxygen outlet manifold passageway 41 extending through the stack as shown in FIG. 9. Grooves in the opposite sides of the plates convey the oxygen from inlet passageway 40 to outlet passageway 41.

Referring now to FIGS. 6 and 8, the back side of each plate has a continuous horizontal groove 42 communicating with inlet passageway 40 through a series of vertical holes 43. The groove 42 in each plate forms an oxygen inlet or distributing manifold duct to supply a plurality of groups of capillary diffusion grooves 45 and 46 in the front and back surfaces of the plates. Oxygen is supplied to the capillary grooves 46 directly through inlet duct grooves 47 and is supplied to front capillary grooves 45 through duct grooves 47 and openings 48.

Similarly, at the bottom of each plate there is a manifold collecting duct groove 50 communicating with outlet passageway 41 through a series of vertical holes 51 as shown in FIGS. 6 and 9. The oxygen flows from back capillary grooves 46 directly to manifold groove 50 through outlet grooves 52 and the oxygen from front capillary grooves 45 flows through openings 53 and grooves 52 to the manifold groove 50.

FIG. 4 shows the blood inlet manifold passageway 55 extending through the stack. This passageway is formed by openings 30 in the membranes and the open centers of spacer blocks 56 shown in FIG. 3. These blocks have vertical openings 57 in their upper and lower sides. The spacer blocks 56 are somewhat smaller than the openings 25 in the plates and are located in these openings, half the block being contained in each of two adjacent plates. A block 56 is placed between the two membranes of each pair to space them apart and press adjacent membranes together when the stack is clamped, as shown in FIG. 4. The blocks 56 are positioned in this relationship by an apertured end block 58 at each end of the stack as shown in FIG. 4.

Incoming blood from inlet manifold passageway 55 flows through openings 57 into vertical distribution ducts 60 formed by complementary registering grooves in adjacent plates. Each vertical distribution duct 60 communicates with a plurality of branch horizontal manifold ducts 61 as shown in FIGS. 2, 6, 8 and 9 similarly formed by complementary grooves in confronting plate surfaces. The grooves forming manifold inlet ducts 61 communicate in turn with the several groups of capillary diffusion grooves 45 and 46.

Grooves 45 and 46 define the capillary passageways for the oxygen. The blood flowing between the membranes being under a higher pressure than the oxygen deflects the membranes into these grooves to form capillary diffusion passageways 62 for the blood following the course of the grooves as shown in FIGS. 10 and 12.

Blood leaving capillary diffusion passageways 62 flows into manifold collecting ducts 63 between the ducts 61 and thence to a vertical outlet duct 64 similar to inlet duct 60. Outlet ducts 64 communicate with outlet manifold passageway 65 through the stack in FIG. 2 which is the same as inlet manifold passageway 55 in FIG. 4.

The plate thickness is reduced in certain marginal areas as indicated at 68 in FIG. 2 to provide a narrow peripheral sealing area 69 surrounding all the various grooves and openings in the plate.

FIGS. 13 to 17 show a modification which is quite similar to the first embodiment but has a single membrane $M_1$ between each pair of plates $P_1$. This arrangement provides a wider choice of materials for the membranes as they are not required to be elastic. These membranes are identical in form to the membrane M in FIG. 7 and reference is made to FIG. 7 for the configuration of membranes $M_1$. The plates $P_1$ are similar in many respects to the plates P in FIGS. 2 and 6 and corresponding parts are identified by the same reference numerals. The complete device in the modification is identical with FIG. 1 in external appearance and reference is made to the description of FIG. 1 with respect to the blood and oxygen inlet and outlet connections and the blood and oxygen bores and ports in plate 10.

Referring now to FIG. 15, oxygen flows from inlet manifold passageway 40 through vertical holes 43 to oxygen manifold distribution duct grooves 42 in the front sides of the plates. Grooves 42 communicate directly with the upper ends of vertical oxygen capillary diffusion grooves 70 in the front sides of the plates. Grooves 70 extend to the lower end of each plate where they communicate with collecting manifold duct groove 50 in FIG. 13 which is similar to the groove 42. The oxygen then flows through vertical holes 51 similar to the holes 43 into a bottom outlet manifold passageway formed in part by openings 28, similar to inlet manifold passageway 40. Reference may be made to FIG. 9 for this outlet passageway, indicated at 41; it communicates through port 20 with outlet bore 19 in plate 10.

FIG. 13 shows the front side of a plate $P_1$. The upper corners of each plate $P_1$ are provided with an opening 75 which registers with blood inlet port 16 in FIG. 14 and an opening 76 which registers with a similar outlet port in the left side of front plate 10. Openings 75 also register with openings 30 in the membranes to provide a blood inlet manifold passageway 77 extending through the stack. In a similar manner the plate openings 76 register with membrane openings 31 to form a blood outlet manifold passageway, not shown in the sectional views.

From passageway 77 the incoming blood flows through vertical holes 78 into groove 80 which is a part of the vertical distribution duct groove 60 in the back side of each plate. Duct 60 supplies a plurality of horizontal manifold distribution duct grooves 61. Grooves 61 supply the blood capillary diffusion grooves 81 as shown in FIG. 16.

Blood leaving each group of capillary diffusion grooves 81 flows into a horizontal collecting manifold duct groove 63 and these convey the blood to vertical collecting duct groove 64 in FIG. 13. The upper end of groove 64 terminates in a horizontal portion 82 similar to the groove 80 whereby the blood flows out through vertical holes 83 similar to holes 78 into an outlet manifold passageway formed in part by the openings 76 in the stack of plates and membranes. The capillary diffusion grooves 81 are all of uniform length, each group being served by one of the inlet manifold grooves 61 and one of the manifold outlet grooves 63.

Thus, in this embodiment in FIGS. 13 to 17, the oxygen grooves are entirely on the front sides of the plates and the blood grooves are entirely on the back sides of the plates. This arrangement permits the use of single inelastic membranes between the plates to separate the blood and oxygen capillaries as shown FIG. 17. The oxygen diffusion grooves 70 confront the blood diffusion grooves 81 whereby the membrane is clamped and sealed by the lands between the grooves.

In both embodiments the plates P and $P_1$ are preferably molded of a suitable plastic such as polyethylene or polyvinyl chloride. End plates 10 and 11 may be made of metal or a hard plastic. The elastic membranes M in FIGS. 1 to 12 are preferably made of silicone rubber while the inelastic membranes $M_1$ in FIGS. 13 to 17 may be made of Teflon, cellophane or collagen.

The capillary passageways in the two embodiments may be more broadly defined as diffusion passageways since in a kidney dialysis device these passageways need not be of capillary size.

I claim:

1. A membrane fluid diffusion exchange device comprising a stack of flat plates and membranes with a pair of said membranes clamped between confronting sides of adjacent plates throughout said stack, grooves in said confronting sides of each pair of said plates defining a planar diffusion system for a first fluid between the membranes of said pair of membranes and for a second fluid on opposite sides of said pair of membranes between said membranes and said plates, said grooves defining an inlet passageway for said first fluid extending along one side of said plates, inlet manifold passageways for said first fluid perpendicular to said inlet passageway extending from said inlet passageway substantially across said plates, an outlet passageway for said first fluid extending along the opposite side of said plates, outlet manifold passageways for said first fluid perpendicular to said outlet passageway extending from said outlet passageway substantially across said plates, said inlet and outlet manifold passageways all being spaced equidistant from each other in interfingered relationship, said diffusion system comprising a plurality of groups of discrete parallel diffusion passageways of uniform length interconnecting said inlet and outlet manifold passageways whereby said first fluid flows in opposite directions through adjacent groups of said diffusion passageways, and inlet and outlet means for passing said second fluid through the grooves which define said parallel diffusion passageways, said inlet and outlet means for said second fluid including holes in said plates extending parallel to and spaced intermediate the opposite surfaces thereof.

2. A device as defined in claim 1 including grooves in said plates extending transversely of said parallel diffusion passageway grooves and interconnecting said holes with said diffusion passageway grooves.

3. A membrane fluid diffusion exchange device comprising a stack of flat plates and membranes with a pair of said membranes clamped between confronting sides of adjacent plates throughout said stack, grooves in said confronting sides of each pair of said plates defining a planar diffusion system for a first fluid between the membranes of said pair of membranes and for a second fluid on opposite sides of said pair of membranes between said membranes and said plates, said grooves defining an inlet passageway for said first fluid extending along one side of said plates, inlet manifold passageways for said first fluid perpendicular to said inlet passageway extending from said inlet passageway substantially across said plates, an outlet passageway for said first fluid extending along the opposite side of said plates, outlet manifold passageways for said first fluid perpendicular to said outlet passageway extending from said outlet passageway substantially across said plates, said inlet and outlet manifold passageways all being spaced equidistant from each other in interfingered relationship, said diffusion system comprising a plurality of groups of discrete parallel diffusion passageways of uniform length interconnecting said inlet and outlet manifold passageways whereby said first fluid flows in opposite directions through adjacent groups of said diffusion passageways, and inlet and outlet means for passing said second fluid through the grooves which define said parallel diffusion passageways, said diffusion passageway grooves extending across said interfingered inlet and outlet manifold passageway grooves for conveying said second fluid across the inlet and outlet paths of said first fluid.

4. A device as defined in claim 3, said diffusion passageway grooves being continuous across the plates through all of said groups of parallel diffusion passageways and across all of said inlet and outlet manifold passageway grooves.

5. A membrane diffusion exchange device comprising a stack of flat plates and membranes with a pair of said membranes clamped between confronting sides of adjacent plates throughout the stack, grooves in said confronting sides of said plates defining a flow pattern for a first fluid between the membranes of each pair, said membranes being deflected into said grooves by said first fluid to form passageways for said first fluid, and grooves in said confronting sides of said plates defining a flow pattern for a second fluid between said membranes and said plates, said grooves for said second fluid extending across certain of said grooves defining the flow pattern of the first fluid whereby the flow paths of the second fluid cross certain flow paths of the first fluid, said grooves for the second fluid being parallel and covering the whole effective area of the plates, said grooves defining said flow pattern for said first fluid including grooves defining inlet and outlet manifold passageways extending across said parallel grooves from opposite sides of the plates in interfingered relation, said parallel grooves defining parallel flow patterns for both fluids between said manifold passageways.

6. A device as defined in claim 5 including transverse grooves in said plates at least one end of said parallel grooves in communication with said parallel grooves, and holes through a section of each plate extending parallel to and spaced intermediate the opposite surfaces thereof communicating with said transverse grooves.

PO-1050
(5/69)

UNITED STATES PATENT OFFICE
CERTIFICATE OF CORRECTION

Patent No. 3,540,595          Dated November 17, 1970

Inventor(s) Miles Lowell Edwards

It is certified that error appears in the above-identified patent and that said Letters Patent are hereby corrected as shown below:

On the bibliographic front page, item [22] "which is a continuation-in-part of" should read -- and --.

Claim 6, column 6, line 46, "at least" should read -- at at least --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents